(12) United States Patent
Huang et al.

(10) Patent No.: US 10,925,101 B2
(45) Date of Patent: Feb. 16, 2021

(54) TECHNIQUES FOR NR CELL/BEAM IDENTIFICATION

(71) Applicant: Apple Inc., Cupertino, CA (US)

(72) Inventors: Rui Huang, Beijing (CN); Jie Cui, Santa Clara, CA (US); Yang Tang, San Jose, CA (US); Hua Li, Beijing (CN); Yuhan Zhou, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/127,942

(22) Filed: Sep. 11, 2018

(65) Prior Publication Data

US 2019/0045559 A1 Feb. 7, 2019

Related U.S. Application Data

(60) Provisional application No. 62/557,024, filed on Sep. 11, 2017, provisional application No. 62/565,617, filed on Sep. 29, 2017.

(51) Int. Cl.
*H04W 76/11* (2018.01)
*H04W 72/04* (2009.01)
*H04W 56/00* (2009.01)
*H04W 24/10* (2009.01)
*H04L 5/00* (2006.01)
*H04B 17/318* (2015.01)
*H04B 7/06* (2006.01)

(52) U.S. Cl.
CPC .......... *H04W 76/11* (2018.02); *H04B 7/0695* (2013.01); *H04B 17/318* (2015.01); *H04L 5/0048* (2013.01); *H04W 24/10* (2013.01); *H04W 56/001* (2013.01); *H04W 72/046* (2013.01); *H04L 5/0023* (2013.01)

(58) Field of Classification Search
CPC . H04W 56/001; H04W 76/11; H04W 72/046; H04W 24/10; H04L 5/0048
See application file for complete search history.

(56) References Cited

U.S. PATENT DOCUMENTS

| | | | |
|---|---|---|---|
| 10,411,940 B2 * | 9/2019 | Ko | H04W 72/04 |
| 2016/0360463 A1 * | 12/2016 | Kim | H04B 7/0617 |
| 2017/0094547 A1 * | 3/2017 | Yum | H04W 56/001 |

(Continued)

OTHER PUBLICATIONS

3GPP, "Technical Specification Group Radio Access Network; NR; Physical layer procedures for control (Release 15)," 3GPP TS 38.213 V1.0.0 (Sep. 2017), 5G, 16 pages.

(Continued)

*Primary Examiner* — Rasheed Gidado
(74) *Attorney, Agent, or Firm* — Sterne, Kessler, Goldstein & Fox P.L.L.C.

(57) ABSTRACT

Embodiments of the present disclosure describe methods, apparatuses, storage media, and systems for cell identification (ID) and beam ID detections in new radio (NR). The detections comprise NR primary synchronization signal (PSS)/secondary synchronization signal (SSS) detection, PBCH DMRS detection, SS reference signal received power (RSRP) measurement, and slot/SS burst boundary timing acquiring. Various embodiments describe how to detect a cell ID and a beam ID in millimeter wave (mmWave) operation. Other embodiments describe further details regarding how to detect NR cell and beam ID during intra-frequency measurements.

20 Claims, 7 Drawing Sheets

(56) References Cited

U.S. PATENT DOCUMENTS

| | | | | |
|---|---|---|---|---|
| 2018/0220360 A1* | 8/2018 | Sheng | ............... | H04W 48/10 |
| 2018/0234960 A1* | 8/2018 | Nagaraja | ............ | H04W 36/0055 |
| 2018/0324721 A1* | 11/2018 | Hakola | ............... | H04L 5/0053 |
| 2018/0324732 A1* | 11/2018 | Park | ............... | H04W 56/0015 |
| 2018/0368054 A1* | 12/2018 | Sheng | ............... | H04W 56/001 |
| 2019/0037481 A1* | 1/2019 | Zhang | ............... | H04L 5/0032 |
| 2019/0141659 A1* | 5/2019 | Frenger | ............... | H04W 76/10 |

OTHER PUBLICATIONS

3GPP, "Technical Specification Group Radio Access Network; New Radio(NR); Requirements for support of radio resource management (Release 15)," 3GPP TS 38.133 V0.0.1 (May 2017), 5G, 14 pages.

Intel Corporation, "Draft of TS38.133 v0.0.1," 3GPP TSG-RAN WG4 Meeting #83, R4-1704696, Agenda item: 10.6.0, May 15-19, 2017, Hangzhou, China, 1 page.

3GPP, "Technical Specification Group Radio Access Network; NR; Radio Resource Control (RRC); Protocol specification (Release 15)," 3GPP TS 38.331 V0.1.0 (Oct. 2017), 5G, 42 pages.

3GPP, "Technical Specification Group Radio Access Network; Evolved Universal Terrestrial Radio Access (E-UTRA); User Equipment (UE) procedures in idle mode (Release 14)," 3GPP TS 36.304 V14.3.0 (Jun. 2017), Jun. 23, 2017, Lte Advanced Pro, 49 pages.

Mediatek Inc., "Offline Discussion Summary on Beam Recovery Mechanism Document for: Discussion," 3GPP TSG RAN WG1 Meeting #90, R1-1714771, Agenda Item: 6.1.2.2.7, Aug. 21-25, 2017, Prague, Czech, 2 pages.

Qualcomm et al., "WF on the use of SS-block for beam management," RAN1-90, R1-1715040, 6.1.2.24, Aug. 21-25, 2017, Prague, Czechia, 2 pages.

International Patent Office—International Search Report and Written Opinion dated Sep. 26, 2018 from International Application No. PCT/US2018/039572, 17 pages.

Mediatek Inc., "Neighbouring Cell Measurement Threshold for NR Mobility," 3GPP TSG-RAN WG2 Meeting #98, R2-1704528, Agenda Item: 10.4.1.4, May 15-19, 2017, Hangzhou, China, 2 pages.

CMCC, "Considerations on threshold for deriving cell quality," 3GPP TSG-RAN WG2 Meeting #98, R2-1705785, Agenda Item: 10.4.1.4, May 15-19, 2017, Hangzhou, China, 5 pages.

Sony, "RRM Measurements open issues," 3GPP TSG RAN WG2 Meeting #98, R2-1704832, Agenda Item: 10.4.1.3, May 15-19, 2017, Hangzhou, China, 7 pages.

\* cited by examiner

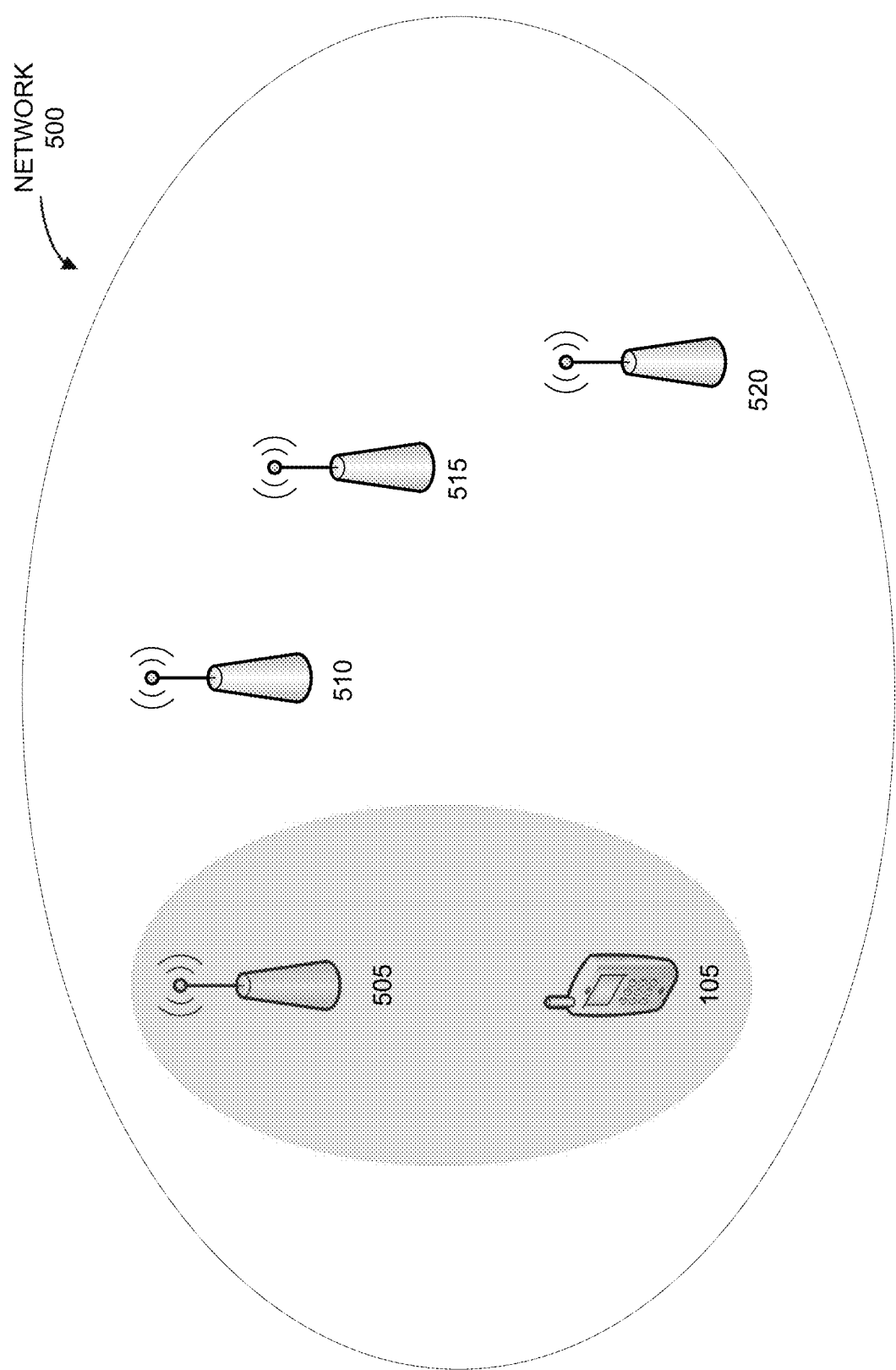

TECHNIQUES FOR NR CELL/BEAM IDENTIFICATION

CROSS REFERENCE TO RELATED APPLICATION

The present application claims priority to U.S. Provisional Patent Application No. 62/557,024, filed Sep. 11, 2017, entitled "New Radio (NR) Cell/Beam Identification Requirements," and U.S. Provisional Patent Application No. 62/565,617, filed Sep. 29, 2017, entitled "Visible Interruption for User Equipment Measurement," all of which are hereby incorporated by reference in their entirety.

FIELD

Embodiments of the present invention relate generally to the technical field of wireless communications.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

An existing cell identification (ID) detection procedure may not be adequate in developing wireless networks. New solutions are needed in this regard.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIG. 5 illustrates an example of a network comprising a UE, a serving cell of the UE and neighbour cells of the UE in the network.

DETAILED DESCRIPTION

In the following detailed description, reference is made to the accompanying drawings that form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrases "A or B" and "A and/or B" mean (A), (B), or (A and B). For the purposes of the present disclosure, the phrases "A, B, or C" and "A, B, and/or C" mean (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include any combination of integrated circuits (for example, a field-programmable gate array (FPGA), an application specific integrated circuit (ASIC), etc.), discrete circuits, combinational logic circuits, system on a chip (SOC), system in a package (SiP), that provides the described functionality. In some embodiments, the circuitry may execute one or more software or firmware modules to provide the described functions. In some embodiments, circuitry may include logic, at least partially operable in hardware.

In new radio (NR) communication, existing Long Term Evolution (LTE) cell identification may not be applicable due to NR reference signal structures, and/or beamforming implementations in millimeter wave (mmWave). Embodiments described herein may include, for example, apparatuses, methods, and storage media for configuring measurements of, or related to, cell and beam identifications in NR communications.

Figure 1:
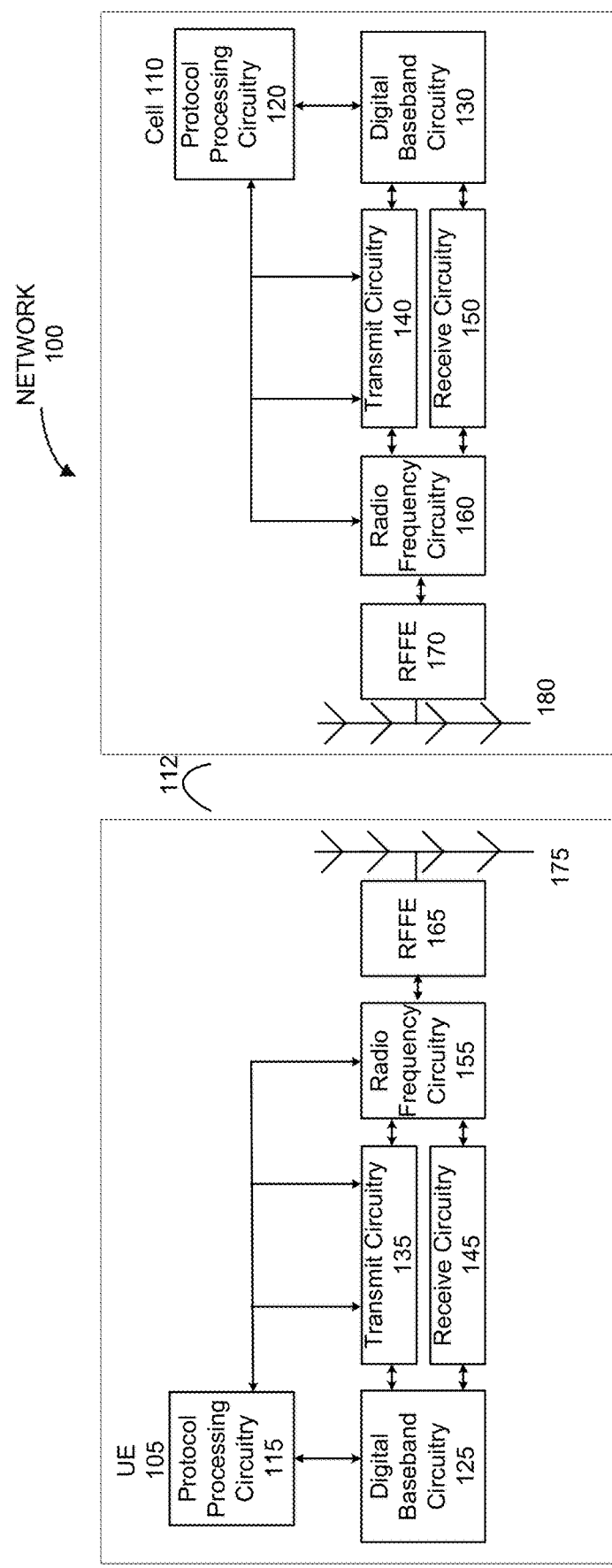
FIG. 1 schematically illustrates an example of a network comprising a user equipment (UE) and a cell in a wireless network, in accordance with various embodiments.

FIG. 1 schematically illustrates an example wireless network 100 (hereinafter "network 100") in accordance with various embodiments herein. The network 100 may include a UE 105 in wireless communication with one cell 110. In some embodiments, the network 100 may be an NR network, a radio access network (RAN) of a third generation partnership project (3GPP) LTE network, such as evolved universal terrestrial radio access network (E-UTRAN), a NextGen RAN (NG RAN), or some other type of RAN. The UE 105 may be configured to connect, for example, to be communicatively coupled, with the cell 110. In this example, the connection 112 is illustrated as an air interface to enable communicative coupling, and can be consistent with cellular communications protocols such as an NR protocol operating at mmWave and sub-mmWave, a Global System for Mobile Communications (GSM) protocol, a code-division multiple access (CDMA) network protocol, a Push-to-Talk (PTT) protocol, a PTT over Cellular (POC)

protocol, a Universal Mobile Telecommunications System (UMTS) protocol, a 3GPP Long Term Evolution (LTE) protocol, and the like.

The UE 105 is illustrated as a smartphone (for example, a handheld touchscreen mobile computing device connectable to one or more cellular networks), but may also comprise any mobile or non-mobile computing devices, such as a Personal Data Assistant (PDA), pager, laptop computer, desktop computer, wireless handset, or any computing device including a wireless communications interface. In some embodiments, the UE 105 can comprise a narrowband Internet of Things (NB-IoT) UE, which can comprise a network access layer designed for low-power NB-IoT applications utilizing short-lived UE connections. An NB-IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An NB-IoT/MTC network describes interconnecting NB-IoT/MTC UEs, which may include uniquely identifiable embedded computing devices (within the Internet infrastructure), with short-lived connections. The NB-IoT/MTC UEs may execute background applications (for example, keep-alive message, status updates, location related services, etc.).

The cell 110 can enable or terminate the connection 112. The cell 110 can be referred to as a base station (BS), access node (AN), NodeB, evolved NodeB (eNB), next Generation NodeB (gNB), RAN node, serving cell, neighbour cell, and so forth, and can comprise ground stations (for example, terrestrial access points) or satellite stations providing coverage within a geographic area.

The cell 110 can be the first point of contact for the UE 105. In some embodiments, the cell 110 can fulfill various logical functions including, but not limited to, radio network controller (RNC) functions such as radio bearer management, uplink and downlink dynamic radio resource management and data packet scheduling, and mobility management.

In some embodiments, a downlink resource grid can be used for downlink transmissions from any of the RAN nodes, for example, the cell 110 to the UE 105, while uplink transmissions can utilize similar techniques. The grid can be a time-frequency grid, called a resource grid or time-frequency resource grid, which is the physical resource in the downlink in each slot. Such a time-frequency plane representation is a common practice for orthogonal frequency division multiplexing (OFDM) systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UE 105. The physical downlink control channel (PDCCH) may carry information about the transport format and resource allocations related to the PDSCH channel, among other things. It may also inform the UE 105 about the transport format, resource allocation, and hybrid automatic repeat request (HARD) information related to the uplink shared channel. Typically, downlink scheduling (assigning control and shared channel resource blocks to the UE 105 within a cell) may be performed at the cell 110 based on channel quality information fed back from any of the UE 105. The downlink resource assignment information may be sent on the PDCCH used for (for example, assigned to) the UE 105.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition.

Some embodiments may use concepts for resource allocation for control channel information that are an extension of the above-described concepts. For example, some embodiments may utilize an enhanced physical downlink control channel (ePDCCH) that uses PDSCH resources for control information transmission. The ePDCCH may be transmitted using one or more enhanced control channel elements (ECCEs). Similar to above, each ECCE may correspond to nine sets of four physical resource elements known as enhanced resource element groups (EREGs). An ECCE may have other numbers of EREGs in some situations.

As shown in FIG. 1, the UE 105 may include mmWave/sub-mmWave/microwave communication circuitry grouped according to their respective functions. The circuitry shown here is for illustrative purposes and the UE 105 may include other circuitry that is not shown here in FIG. 1. The UE 105 may include protocol processing circuitry 115, which may implement one or more of layer operations related to medium access control (MAC), radio link control (RLC), packet data convergence protocol (PDCP), radio resource control (RRC) and non-access stratum (NAS). The protocol processing circuitry 115 may include one or more processing cores (not shown) to execute instructions and one or more memory structures (not shown) to store program and data information.

The UE 105 may further include digital baseband circuitry 125, which may implement physical layer (PHY) functions including one or more of HARQ functions, scrambling and/or descrambling, coding and/or decoding, layer mapping and/or de-mapping, modulation symbol mapping, received symbol and/or bit metric determination, multi-antenna port pre-coding and/or decoding, which may include one or more of space-time, space-frequency or spatial coding, reference signal generation and/or detection, preamble sequence generation and/or decoding, synchronization sequence generation and/or detection, control channel signal blind decoding, and other related functions.

The UE 105 may further include transmit circuitry 135, receive circuitry 145, radio frequency (RF) circuitry 155, and RF front end (RFFE) 165, which may include or connect to one or more antenna panels 175.

In some embodiments, RF circuitry 155 may include multiple parallel RF chains or branches for one or more of transmit or receive functions; each chain or branch may be coupled with one antenna panel 175.

In some embodiments, the protocol processing circuitry 115 may include one or more instances of control circuitry (not shown) to provide control functions for the digital baseband circuitry 125 (or simply, "baseband circuitry 125"), transmit circuitry 135, receive circuitry 145, radio frequency circuitry 155, RFFE 165, and one or more antenna panels 175.

Figure 2:
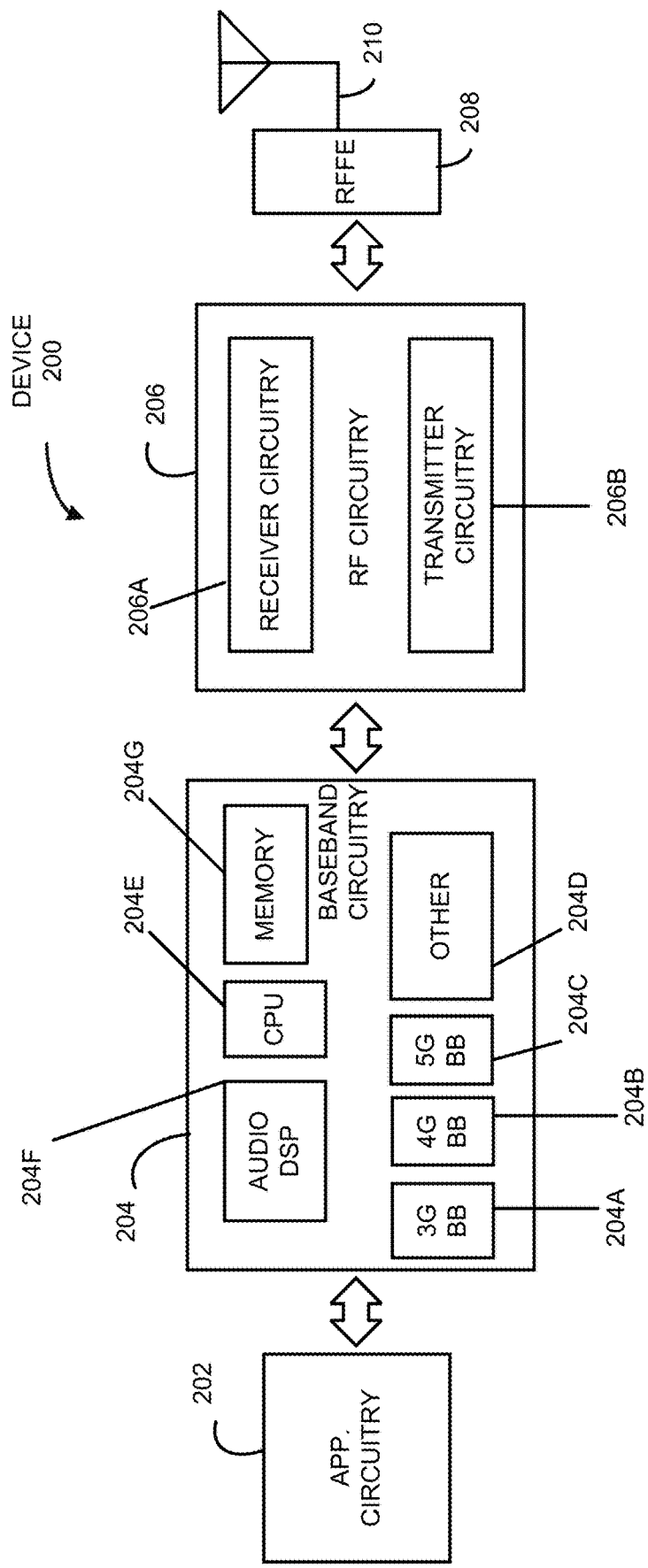
FIG. 2 illustrates example components of a device in accordance with various embodiments.
Figure 6:
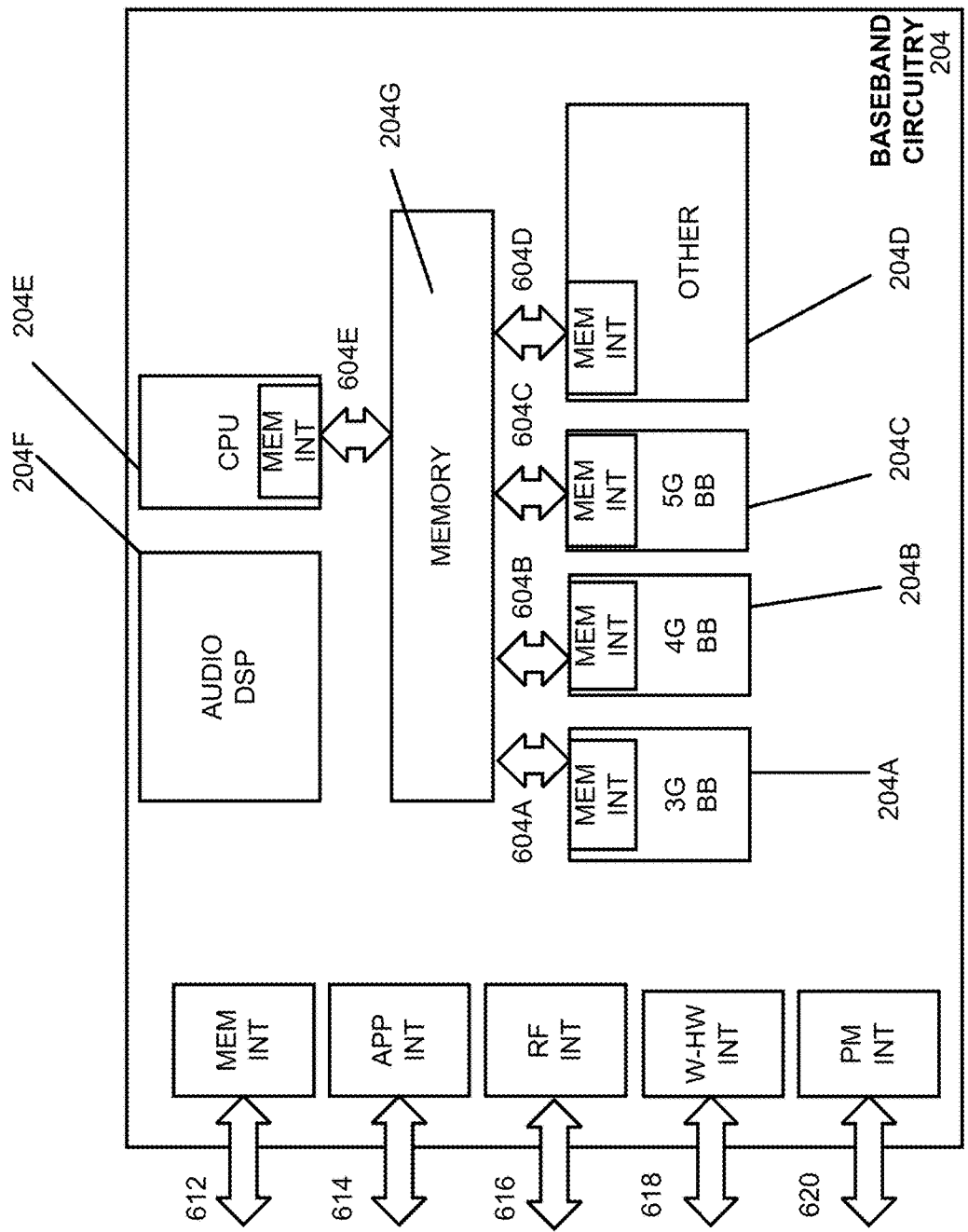
FIG. 6 illustrates example interfaces of baseband circuitry in accordance with some embodiments.

A UE reception may be established by and via the one or more antenna panels 175, RFFE 165, RF circuitry 155, receive circuitry 145, digital baseband circuitry 125, and protocol processing circuitry 115. The one or more antenna panels 175 may receive a transmission from the cell 110 by receive-beamforming signals received by a plurality of antennas/antenna elements of the one or more antenna panels 175. The transmission from the cell 110 may be transmit-beamformed by antennas of the cell 110. Further details regarding the UE 105 architecture are illustrated in FIGS. 2 and 6. In some embodiments, the baseband circuitry 125 may contain both the transmit circuitry 135 and the receive circuitry 145. In other embodiments, the baseband circuitry 125 may be implemented in separate chips or modules, for example, one chip including the transmit circuitry 135 and another chip including the receive circuitry 145.

Similar to the UE 105, the cell 110 may include mmWave/sub-mmWave/microwave communication circuitry grouped according to functions. The cell 110 may include protocol processing circuitry 120, digital baseband circuitry 130 (or simply, "baseband circuitry 130"), transmit circuitry 140, receive circuitry 150, RF circuitry 160, RFFE 170, and one or more antenna panels 180.

A cell transmission may be established by and via the protocol processing circuitry 120, digital baseband circuitry 130, transmit circuitry 140, RF circuitry 160, RFFE 170, and one or more antenna panels 180. The one or more antenna panels 180 may transmit a signal by forming a transmit beam.

FIG. 2 illustrates example components of a device 200 in accordance with some embodiments. In some embodiments, the device 200 may include application circuitry 202, baseband circuitry 204, RF circuitry 206, RFFE circuitry 208, and a plurality of antennas 210 together at least as shown. The baseband circuitry 204 may be similar to and substantially interchangeable with the baseband circuitry 125 in some embodiments. The plurality of antennas 210 may constitute one or more antenna panels for beamforming. The components of the illustrated device 200 may be included in a UE or a cell. In some embodiments, the device 200 may include fewer elements (for example, a cell may not utilize the application circuitry 202, and instead include a processor/controller to process IP data received from an evolved packet core (EPC)). In some embodiments, the device 200 may include additional elements such as, for example, a memory/storage, display, camera, sensor, or input/output (I/O) interface. In other embodiments, the components described below may be included in more than one device (for example, said circuitry may be separately included in more than one device for Cloud-RAN (C-RAN) implementations).

The application circuitry 202 may include one or more application processors. For example, the application circuitry 202 may include circuitry such as, but not limited to, one or more single-core or multi-core processors. The processors may include any combination of general-purpose processors and dedicated processors (for example, graphics processors, application processors, etc.). The processors may be coupled with or may include memory/storage and may be configured to execute instructions stored in the memory/storage to enable various applications or operating systems to run on the device 200. In some embodiments, processors of application circuitry 202 may process IP data packets received from an EPC.

The baseband circuitry 204 may include circuitry such as, but not limited to, one or more single-core or multi-core processors. The baseband circuitry 204 may be similar to and substantially interchangeable with the baseband circuitry 125 in some embodiments. The baseband circuitry 204 may include one or more baseband processors or control logic to process baseband signals received from a receive signal path of the RF circuitry 206 and to generate baseband signals for a transmit signal path of the RF circuitry 206. Baseband circuitry 204 may interface with the application circuitry 202 for generation and processing of the baseband signals and for controlling operations of the RF circuitry 206. For example, in some embodiments, the baseband circuitry 204 may include a third generation (3G) baseband processor 204A, a fourth generation (4G) baseband processor 204B, a fifth generation (5G) baseband processor 204C, or other baseband processor(s) 204D for other existing generations, generations in development or to be developed in the future (for example, second generation (2G), sixth generation (6G), etc.). The baseband circuitry 204 (for example, one or more of baseband processors 204A-D) may handle various radio control functions that enable communication with one or more radio networks via the RF circuitry 206. In other embodiments, some or all of the functionality of baseband processors 204A-D may be included in modules stored in the memory 204G and executed via a central processing unit (CPU) 204E. The radio control functions may include, but are not limited to, signal modulation/demodulation, encoding/decoding, radio frequency shifting, etc. In some embodiments, modulation/demodulation circuitry of the baseband circuitry 204 may include Fast-Fourier Transform (FFT), precoding, or constellation mapping/demapping functionality. In some embodiments, encoding/decoding circuitry of the baseband circuitry 204 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 204 may include one or more audio digital signal processor(s) (DSP) 204F. The audio DSP(s) 204F may include elements for compression/decompression and echo cancellation and may include other suitable processing elements in other embodiments. Components of the baseband circuitry may be suitably combined in a single chip, in a single chipset, or disposed on a same circuit board in some embodiments. In some embodiments, some or all of the constituent components of the baseband circuitry 204 and the application circuitry 202 may be implemented together such as, for example, on a SOC.

In some embodiments, the baseband circuitry 204 may provide for communication compatible with one or more radio technologies. For example, in some embodiments, the baseband circuitry 204 may support communication with an evolved universal terrestrial radio access network (E-UTRAN) or other wireless metropolitan area networks (WMAN), a wireless local area network (WLAN), a wireless personal area network (WPAN). Embodiments in which the baseband circuitry 204 is configured to support radio communications of more than one wireless protocol may be referred to as multi-mode baseband circuitry.

RF circuitry 206 may enable communication with wireless networks using modulated electromagnetic radiation through a non-solid medium. In various embodiments, the RF circuitry 206 may include one or more switches, filters, amplifiers, etc. to facilitate the communication with the wireless network. RF circuitry 206 may include receiver circuitry 206A, which may include circuitry to down-convert RF signals received from the RFFE circuitry 208 and provide baseband signals to the baseband circuitry 204. RF circuitry 206 may also include transmitter circuitry 206B, which may include circuitry to up-convert baseband signals provided by the baseband circuitry 204 and provide RF output signals to the RFFE circuitry 208 for transmission.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 206 may include analog-to-digital converter (ADC) and digital-to-analog converter (DAC) circuitry and the baseband circuitry 204 may include a digital baseband interface to communicate with the RF circuitry 206.

In some dual-mode embodiments, a separate radio integrated circuit (IC) circuitry may be provided for processing signals for each spectrum, although the scope of the embodiments is not limited in this respect.

The RFFE circuitry 208 may include a receive signal path, which may include circuitry configured to operate on RF beams received from one or more antennas 210. The RF beams may be transmit beams formed and transmitted by the cell 110 while operating in mmWave, sub-mmWave, or microwave frequency range. The RFFE circuitry 208 coupled with the one or more antennas 210 may receive the transmit beams and proceed them to the RF circuitry 206 for further processing. The RFFE circuitry 208 may also include a transmit signal path, which may include circuitry configured to amplify signals for transmission provided by the RF circuitry 206 for transmission by one or more of the antennas 210, with or without beamforming. In various embodiments, the amplification through transmit or receive signal paths may be done solely in the RF circuitry 206, solely in the RFFE circuitry 208, or in both the RF circuitry 206 and the RFFE circuitry 208.

In some embodiments, the RFFE circuitry 208 may include a TX/RX switch to switch between transmit mode and receive mode operation. The RFFE circuitry 208 may include a receive signal path and a transmit signal path. The receive signal path of the RFFE circuitry 208 may include a low noise amplifier (LNA) to amplify received RF beams and provide the amplified received RF signals as an output (for example, to the RF circuitry 206). The transmit signal path of the RFFE circuitry 208 may include a power amplifier (PA) to amplify input RF signals (for example, provided by RF circuitry 206), and one or more filters to generate RF signals for beamforming and subsequent transmission (for example, by one or more of the one or more antennas 210).

Processors of the application circuitry 202 and processors of the baseband circuitry 204 may be used to execute elements of one or more instances of a protocol stack. For example, processors of the baseband circuitry 204, alone or in combination, may be used to execute Layer 3, Layer 2, or Layer 1 functionality, while processors of the application circuitry 202 may utilize data (for example, packet data) received from these layers and further execute Layer 4 functionality (for example, transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/AN, described in further detail below.

In NR, a synchronization signal (SS) may include a primary synchronization signal (PSS) and secondary synchronization signal (SSS), both of which may be contained in one or more synchronization signal blocks (SSBs). Both PSS and SSS contains cell ID information respectively. An SSB may also contain physical broadcast channel (PBCH) symbols. Each slot may contain two SSBs. The two SSBs may be repeated in more than one slot. One or more such slots may constitute an SS burst. One or more SS bursts may constitute an SS burst set. Such an SS burst set may be transmitted periodically based on an SS burst set periodicity. Various embodiments herein describe how to detect a cell identification (ID) in NR.

In some embodiments, a successful detection of NR cell ID may require detecting both PSS and SSS correctly, and that the timing offset between the detected PSS and SSS is within half cyclic prefix (CP) length. To detect PSS ID and SSS ID correctly, the two SSBs in one slot need to be detected correctly so that pertinent cell ID information can be extracted therefrom. An NR PSS/SSS detection delay may be allocated to a UE to detect NR cell ID.

In some embodiments, a search window may be used for detecting PSS ID and SSS ID. For example, a 5 milliseconds (ms) SS transmission window may be used for detecting. Further, all of the SSBs within the SS transmission window may be used for cell ID detection. All of the SSBs in an SS burst set may indicate one cell ID and contain this cell ID information, despite that each of those SSBs may correspond to different transmit beams from the cell in mmWave operation with transmit beamforming.

In some embodiments, cross-correlation between the received signal and local reference PSS may be used to identify peaks in SSBs so as to detect PSS and SSS ID information. However, the PSS and SSS detections may not be sufficient to provide correct timing detection to detect slot boundaries or SS burst boundaries, which may lead to inaccurate SSB detection in a given slot. To detect PSS and SSS ID information correctly, slot and SS burst boundaries may be identified correctly.

Figure 3:
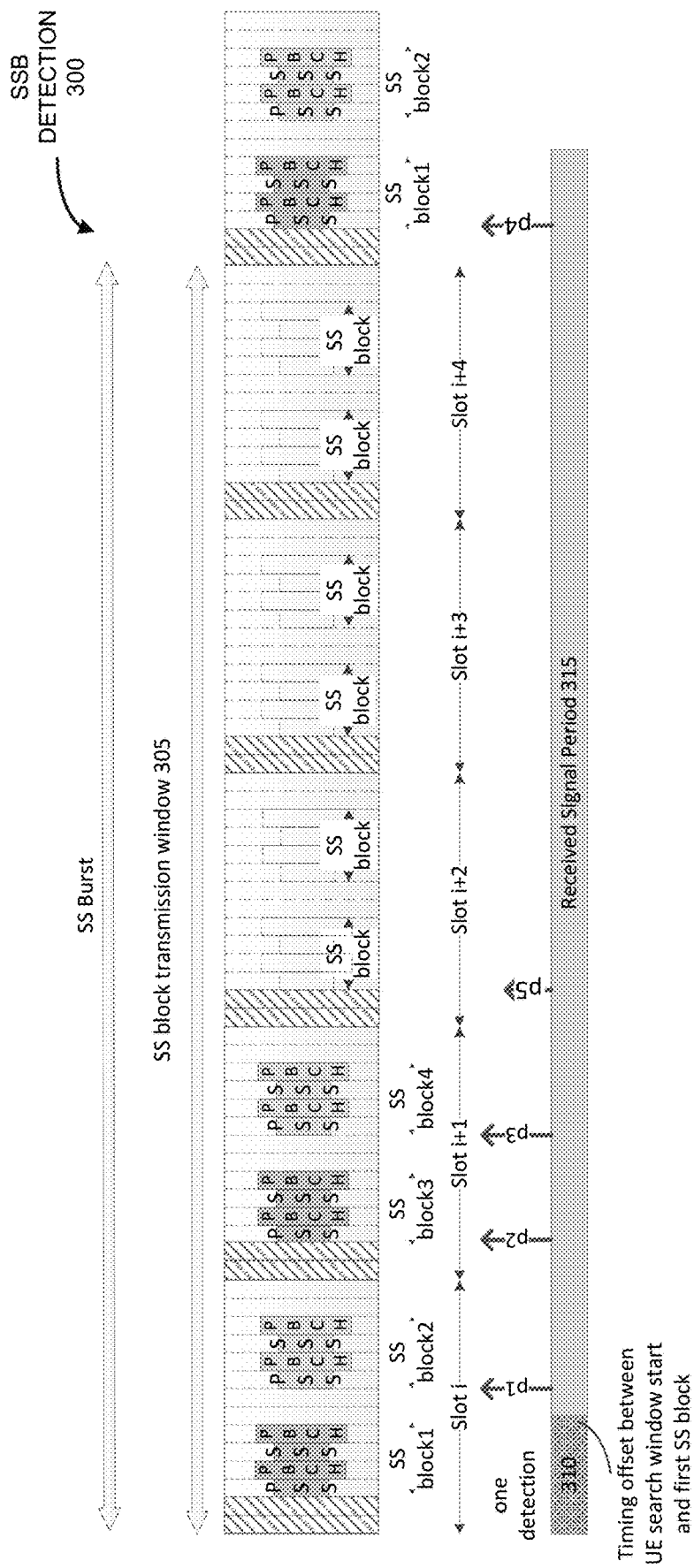
FIG. 3 illustrates an example of synchronization signal block (SSB) detection by a UE.

FIG. 3 illustrates an example of SSB detection 300 based on an SS with 15 kHz subcarrier spacing (SCS). The one complete SS burst contains five slots, and each slot may contain two SSBs. An SS transmission window may begin with the beginning of an SS burst, as shown in 305. Alternatively, the SSB transmission window may begin in the middle of an SS burst. A gap 310 illustrates a timing offset between the beginning of the UE 105 search window (SS transmission window) and the beginning of the SS burst. During the received signal period 315, the UE may detect four strong correlation peaks, p1, p2, p3, and p4 from four SSBs. However, the UE 105 may not be able to detect which two of the SSBs are from one slot, or whether all four of the SSBs are from one SS burst without identifying the slot boundaries and/or SS burst boundaries. Therefore, PSS and SSS ID information carried by the SSBs may not be detected successfully. Thus, slot boundaries and SS burst boundaries may need to be identified so that the two SSBs within one slot may be detected successfully.

In some embodiments, SSB time index may be used to identify slot boundaries and SS burst boundaries for identifying the two SSBs in one slot. SSB time index may indicate SSB time locations and may be indexed from 0 to L−1 in an ascending order within a half radio frame. L may indicate a number of possible candidate SSB locations within an SS burst. L may be 4 or 8 in an operation of frequency below 6 GHz, and 64 in an operation of frequency above 6 GHz, according to SS burst composition. For L=8, an SSB time index may be carried by a PBCH demodulation reference signal (DMRS), and have 8 PBCH-DMRS sequences, {a_0, . . . a_7}, which may be indicated by 3 least significant bits (LSBs). For L=64, an SSB time index may be carried by both a PBCH-DMRS and a PBCH payload. Each the PBCH DMRS and the PBCH payload may use 3 LSBs respectively, and together 6 LSBs may indicate the 64 SSB time indexes. For L=4, a 3-LSB PBCH-DMRS may be used to indicate the 4 SSB time indexes, with one remaining bit being set to 0 and not transmitted by the PBCH symbol. In accordance, a PBCH-DMRS index detection may detect correct SSB time locations, while L=8 or 4; a PBCH-DMRS index detection together with a PBCH payload decoding may detect correct SSB locations, while L=64. Thus, PBCH-DMRS index detection may be used to identify the two SSBs in one SS burst set for sub-6 GHz NR bands. PBCH-DMRS index detection and PBCH payload decoding together may be used to identify the two SSBs for mmWave NR bands. Therefore, pertinent SSB time-index-detection delay may be allocated to the UE 105 for NR cell ID detection. An SSB time-index-detection delay may include a PBCH-DMRS detection delay for cell ID detection in sub-6 GHz NR bands. An SSB time-index-detection delay may include a PBCH-DMRS detection delay and a PBCH decoding delay for cell ID detection in mmWave NR bands. It is noted that mmWave NR bands refer to NR bands occupying frequency range above 6 GHz.

In some embodiments, an NR cell ID detection may include measuring reference signal received power (RSRP) with respect to the received SS. SS-RSRP measurements may concern SSS in the received SSBs. Thus, an NR cell ID detection may allocate an SS-RSRP measurement delay to the UE 105 as well.

Therefore, an NR cell ID detection may require a NR PSS/SSS detection delay, SS-RSRP measurement delay, an SSB time-index-detection delay to be allocated to a UE for NR cell ID detection. The SSB time-index-detection may include a PBCH-DMRS detection delay for a detection operating in sub-6 GHz bands, or a PBCH-DMRS detection delay and a PBCH decoding delay for a detection operating in mmWave bands.

In some embodiments, the above-identified NR cell ID detection may be used for beam management procedures in mmWave operation. In NR mmWave operation, transmit beams may be formed by a cell to improve (for example, reduce) overall path loss. In beam management procedure, multiple transmit beams may be formed with respect to one or more SSBs by various transmit beam configurations. The UE 105 may then receive those SSBs associated with different transmit beams in one or more SS bursts. The UE 105 may detect NR PSS/SSS ID information and SSB time index information to identify each SSB associated with a specific beam. It is beneficial to update beam qualities timely in NR operations, because the beams may change quickly from one configuration to another and it may not be sufficient to rely on UE reporting a number of best transmit beams to the network from time to time. Thus, both measured SS-RSRP and the associated SSB time index may be reported to the serving cell in the network during beam management procedure. Such measured SS-RSRP and the associated SSB time index information may be reported in a beam-management reporting message.

In some embodiments, from beam recovery perspective, SSB beams may be used to identify new candidate beams. Measuring SS-RSRP of SSBs may be an effective mechanism to identify new beams in a beam recovery procedure. Both SS-RSRP and the associated SSB time index may be reported to identify a new beam.

Therefore, a beam management procedure or beam recovery procedure may require a NR PSS/SSS detection delay, SS-RSRP measurement delay, a SSB time index delay to be allocated to a UE for NR cell ID detection.

In some other embodiments, channel state information reference signal (CSI-RS), alone or together with SSB, may be used in beam management procedure or beam recovery procedure.

Figure 4B:
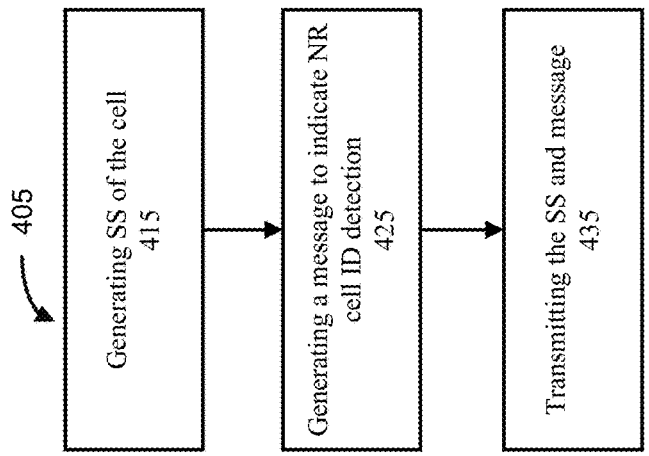
FIG. 4B illustrates an operation flow/algorithmic structure to facilitate the process by a serving cell in accordance with some embodiments.
Figure 4A:
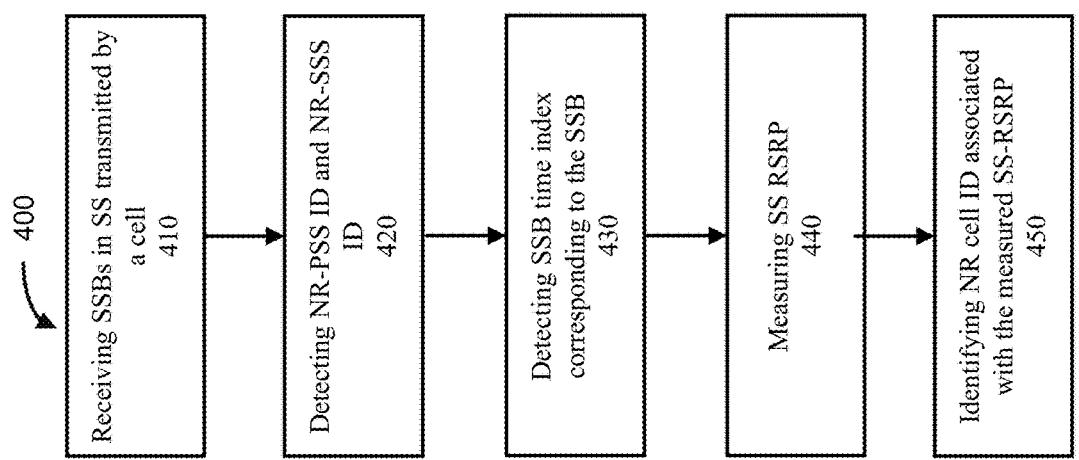
FIG. 4A illustrates an operation flow/algorithmic structure to facilitate a process of new radio (NR) cell ID detection with some embodiments.

FIG. 4A illustrates an operation flow/algorithmic structure 400 to facilitate a process of detecting a NR cell ID by the UE 105 in accordance with some embodiments. The operation flow/algorithmic structure 400 may be performed by the UE 105 or circuitry thereof. For example, in some embodiments the operation flow/algorithmic structure 400 may be implemented by digital baseband circuitry 125 and a CPU 204E.

The operation flow/algorithmic structure 400 may include, at 410, receiving SSBs in an SS that is transmitted by a cell. The SS may include a plurality of SSBs. Each SSB may include PSS, SSS, and PBCH symbols. Both PSS and SSS contains cell ID information respectively. Each slot may contain two SSBs. The two SSBs may be repeated in more than one slot. One or more such slots may constitute an SS burst. One or more SS bursts may constitute an SS burst set. Such an SS burst set may be transmitted periodically based on an SS burst set periodicity. The SS may be transmitted from a serving cell of the UE 105 or a neighbour cell. In some embodiments, the NR cell ID detection may be completed within a time period, which may be determined by the cell 110. Such a time period may be constituted by an NR PSS/SSS detection delay, an SSB time-index detection delay, and a measurement delay.

The operation flow/algorithmic structure 400 may further include, at 420, detecting NR-PSS IDs and NR-SSS IDs. To detect PSS ID and SSS ID correctly, the two SSBs in one slot need to be detected correctly so that pertinent cell ID information can be extracted therefrom. In some embodiments, the UE may need to detect the NR-PSS/SSS IDs within the NR PSS/SSS detection delay. The NR PSS/SSS detection delay may be determined and assigned to the UE 105 by a cell in the network. The cell may be a serving cell to the UE 105.

In some embodiments, a search window may be used for detecting NR-PSS ID and NR-SSS ID. For example, a 5 ms SS transmission window may be used for detecting. Further, all of the SSBs within the SS transmission window may be used for cell ID detection. All of the SSBs in an SS burst set may indicate one cell ID and contain such ID information, despite that each of those SSBs may correspond to different transmit beams from the cell in mmWave operation with transmit beamforming.

The operation flow/algorithmic structure 400 may further include, at 430, detecting SSB time index. SSB time index may be used to identify slot boundaries and SS burst boundaries for identifying the two SSBs in one slot. Such an SSB-time index-detection may be completed within the SSB-time-index detection delay. SSB time index may indicate SSB time locations and may be indexed from 0 to L−1 in an ascending order within a half radio frame. L may indicate a number of possible candidate SSB locations within an SS burst set. L may be 4 or 8 in an operation of frequency below 6 GHz, and 64 in an operation of frequency above 6 GHz, according to SS burst composition. For L=8, an SSB time index may be carried by a PBCH demodulation reference signal (DMRS), and have 8 PBCH-DMRS sequences, {a_0, . . . a_7}, which may be indicated by three least significant bits (LSBs). For L=64, an SSB time index may be carried by both a PBCH-DMRS and a PBCH payload. Each the PBCH DMRS and the PBCH payload may use 3 LSBs respectively, and together 6 LSBs may indicate the 64 SSB time indexes. For L=4, a same 3-LSB PBCH-DMRS may be used to indicate the four SSB time indexes, with one remaining bit being set to 0 and not transmitted by the PBCH symbol. In accordance, a PBCH-DMRS index detection may detect correct SSB time locations, while L=8 or 4; a PBCH-DMRS index detection together with a PBCH payload decoding may detect correct SSB locations, while L=64. Thus, PBCH-DMRS index detection may be used to identify the two SSBs in one SS burst set for sub-6 GHz NR bands. PBCH-DMRS index detection and PBCH payload decoding together may be used to identify the two SSBs for mmWave NR bands. Corresponding SSB time-index-detection delay may be assigned to the UE 105 for NR cell ID detection. An SSB time-index-detection delay may include a PBCH-DMRS detection delay for cell ID detection in sub-6 GHz NR bands, or a PBCH-DMRS detection delay and a PBCH decoding delay for cell ID detection in mmWave NR bands.

In some embodiments, the SSB-time-index detection delay may be determined and assigned to the UE 105 by a serving cell of the UE 105.

In some embodiments, the UE 105 may determine an NR cell ID according to the detected NR-PSS ID and NR-SSS-ID, and the detected corresponding PBCH-DMRS for sub-6 GHz NR bands. In mmWave NR bands, PBCH payload decoding may also be needed for such NR cell ID detection.

The operation flow/algorithmic structure 400 may further include, at 440, measuring SS-RSRP of the SSBs within an assigned measurement delay. In some embodiments, an NR cell ID detection may include measuring reference signal received power (RSRP) with respect to the received SS. SS-RSRP measurements may concern SSS in the received SSBs. Thus, a NR cell ID detection may allocate an SS-RSRP measurement delay to the UE 105. Such an SS-RSRP measurement delay may be determined and assigned to the UE 105 by a serving cell of the UE 105. In some embodiments, the serving cell may transmit a message to the UE 105 to indicate the SS-RSRP measurement delay. In some other embodiments, the serving cell may transmit a message to the UE 105 to indicate a time for NR cell ID detection. Such a time may include the SS-RSRP measurement delay.

In some embodiments, the UE may need to complete the NE cell ID detection within a time period. Such a time period may refer to an NR cell ID detection delay that comprises an NR PSS/SSS detection delay, an SS-RSRP measurement delay, an SSB time-index-detection delay. An NR cell ID detection may require an NR PSS/SSS detection delay, an SS-RSRP measurement delay, an SSB time-index-detection delay to be allocated to a UE for NR cell ID detection, combined or individually. The SSB time-index-detection delay may include a PBCH-DMRS detection delay for a detection operating in sub-6 GHz bands, or a PBCH-DMRS detection delay and a PBCH decoding delay for a detection operating in mmWave bands. In some embodiments, the serving cell may transmit a message to the UE 105 to indicate the SSB time-index-detection delay. In some other embodiments, the serving cell may transmit a message to the UE 105 to indicate a time for NR cell ID detection. Such a time may include the SSB time-index-detection delay.

The operation flow/algorithmic structure 400 may further include, at 450, identifying an NR cell ID associated with the measured SS-RSRP. In response to an NR cell ID detection request, the UE 105 may determine the measured SS-RSRP with the detected NR cell ID.

In some embodiments, the UE 105 may report the measured SS-RSRP and the NR cell ID to the serving cell. In other embodiments, the UE 105 may report the measured SS-RSRP and the SSB time index to the serving cell. The reporting message may also include the NR cell ID information. In some other embodiments, the UE 105 may report the measured SS-RSRP, the SSB time index and NR PSS/SSS ID information to the serving cell.

In some embodiments, the above-identified NR cell ID detection may be used for beam management procedures in mmWave operation. In beam management procedure, multiple transmit beams may be formed with respect to one or more SSBs by various transmit beam configurations. The UE 105 may receive those SSBs associated with different transmit beams in one or more SS bursts. The UE 105 may detect NR PSS/SSS ID information and SSB time index information to identify each SSB associated with a specific beam. Both measured SS-RSRP and the associated SSB time index may be reported to the serving cell in the network during beam management procedure. Such measured SS-RSRP and the associated SSB time index information may be reported in a beam-management reporting message.

In some embodiments, from beam recovery perspective, SSB beams may be used to identify new candidate beams. Measuring RSRP of SSBs may be an effective mechanism to identify new beams in a beam recovery procedure. Both SS-RSRP and the associated SSB time index may be reported to identify a new beam.

Therefore, a beam management procedure or beam recovery procedure may require a NR PSS/SSS detection delay, SS-RSRP measurement delay, a PBCH-DMRS detection delay to be allocated to a UE for a detection operating in sub-6 GHz bands. An NR cell ID may in addition require a PBCH decoding delay to be allocated to a UE for a detection operating in mmWave bands, which is above 6 GHz.

In some other embodiments, channel state information reference signal (CSI-RS), alone or together with SSB, may be used in beam management procedure or beam recovery procedure.

FIG. 4B illustrates an operation flow/algorithmic structure 405 to facilitate the process of NR cell ID detection by the cell 110 in accordance with some embodiments. The operation flow/algorithmic structure 405 may be performed by the cell 110 or circuitry thereof. For example, in some embodiments the operation flow/algorithmic structure 400 may be implemented by digital baseband circuitry 125 and a CPU 204E.

The operation flow/algorithmic structure 405 may include, at 415, generating at least one SS of the cell. The SS may include a plurality of SSBs. Each SSB may include PSS, SSS, and PBCH symbols. Both PSS and SSS contains cell ID information respectively. Each slot may contain two SSBs. The two SSBs may be repeated in more than one slots. One or more such slots may constitute an SS burst. One or more SS bursts may constitute an SS burst set. Such an SS burst set may be transmitted periodically based on an SS burst set periodicity. In some embodiments, the SS may be transmit-beamformed by the cell in mmWave operation.

The operation flow/algorithmic structure 405 may further include, at 425, generating a message to indicate an NR cell ID detection request to the UE 105. The cell 110 may be a serving cell of the UE 105.

The operation flow/algorithmic structure 405 may further include, at 435, transmitting the generated SS and message.

FIG. 5 illustrates in a network 500, the UE 105 may detect synchronization signals from surrounding cells, for example, cells 505, 510, 515, and/or 520. In some examples, cell 505 may be the serving cell of the UE 105, and the other cells 510, 515, and 520 may be neighbour cells of the UE 105. The UE 105 may receive SSBs for measurement from either the serving cell 505 or one of the neighbour cells 510, 515, and 520, while receiving another signal from the serving cell 505. The UE 105 may not able to process both signals and need certain scheduling under such situations. For example, multiple numerologies with multiple subcarrier spacings (SCSs) are available in NR operation. However, the UE 105 may not be able to receive simultaneously two signals with different SCSs.

In some embodiments, the serving cell 505 may transmit SSB resource elements (REs) in OFDM symbols with a specific SCS to the UE 105, so that the UE 105 may operate to receive and detect the SSB REs with that specific SCS. Meanwhile, the same OFDM symbols may also carry non-SSB REs with a different SCS. The non-SSB REs may be control or data signals, such as PDCCH and PDSCH. The UE 105 may not effectively receive the non-SSB REs while receiving SSB REs, because the UE 105 may not support receiving signals with different SCSs simultaneously. Thus, a visible interruption or measurement gap may be scheduled to the UE 105 for such intra-frequency measurement. Intra-frequency measurement refers to the condition when the two received signals have the same center frequency. The measurements may include, but are not limited to, SS-RSRP, SS reference signal received quality (RSRQ), SS relative received signal strength (RSSI), and SS signal to interference-and-noise ratio (SINR). A visible interruption may indicate a period of time, during which the UE 105 may not receive or transmit any signal from or to the serving cell 505. In the case that an SS measurement window is defined for intra-frequency measurements, the period of the visible interruption may be the period of the SS measurement window. The signal may include but not be limited to physical downlink control channel (PDCCH), physical downlink shared channel (PDSCH), Physical uplink control channel (PUCCH), and physical uplink shared channel (PUSCH). Since the serving cell 505 transmits both the SSB REs and non-SSB REs, the serving cell 505 may be aware of any potential SSB/non-SSB collision and schedule visible interruption or measurement gap accordingly.

In some embodiments, a neighbour cell may be scheduled by the serving cell 505 as a target cell for cell ID detection or other related detections. The serving cell 505 may transmit SSB REs or non-SSB REs with a specific SCS to the UE 105, while the target cell may transmit SSB REs with a different SCS. The UE 105 may not be able to receive both signals simultaneously if the two signals collide in time. Thus, the serving cell 505 may schedule a visible interruption or measurement gap if the SCS of the target cell SSB and the SCS of the collided serving cell SSB/non-SSB REs are different. Under the scheduled visible interruption or measurement gap, the UE 105 may not be expected to receive or transmit any signal from or to the serving cell 505. Such a signal may include but not be limited to PDCCH, PDSCH, PUCCH, and PUSCH. The UE 105 may detect the SSB REs received from the target cell. It is noted that the CSI-RS may be used instead of SSB REs in the above discussion.

In some embodiments, a semi-persistence scheduling (SPS) may be used regarding the UE 105, so the above-discussed intra-frequency signal collision may not be avoidable. Using visible interruption may be a flexible solution for the network and the UE 105. During such a scheduled visible interruption, the serving cell 505 may mute transmission to the UE 105 even if there is a scheduled SPS. Using visible interruption may have an advantage for needless configuring repetition period or duration, in contrast with legacy gap. Thus, it may provide a more flexible solution than configuring a gap.

In some embodiments, the UE 105 may use receiving (Rx) beamforming for mmWave signal reception. In accordance, the UE 105 may use different Rx beam patterns to receive signals from the serving cell 505 and a neighbour cell. Therefore, the UE 105 may not receive both signals from the serving cell 505 and the target cell. The signals may be SSBs or non-SSBs. Thus, a visible interruption or measurement gap may be scheduled to the UE 105 for intra-frequency measurements in mmWave frequency. The UE 105 may also need RF retuning, which is an RF adjustment in spatial domain, during the measurement.

In some embodiments, a UE reception may experience an inter-frequency collision between SSBs/CSI-RS of the target cell and signal from the serving cell 505. In mmWave operation, a visible interruption or measurement gap may always be needed regardless of intra- or inter-frequency collision, because respective Rx beam patterns may be used for receiving serving cell transmission and target cell transmission.

FIG. 6 illustrates example interfaces of baseband circuitry in accordance with some embodiments. As discussed above, the baseband circuitry 204 of FIG. 2 may comprise processors 204A-204E and a memory 204G utilized by said processors. Each of the processors 204A-204E may include a memory interface, 604A-604E, respectively, to send/receive data to/from the memory 204G.

The baseband circuitry 204 may further include one or more interfaces to communicatively couple to other circuitries/devices, such as a memory interface 612 (for example, an interface to send/receive data to/from memory external to the baseband circuitry 204), an application circuitry interface 614 (for example, an interface to send/receive data to/from the application circuitry 202 of FIG. 2), an RF circuitry interface 616 (for example, an interface to send/receive data to/from RF circuitry 206 of FIG. 2), a wireless hardware connectivity interface 618 (for example, an interface to send/receive data to/from Near Field Communication (NFC) components, Bluetooth® components (for example, Bluetooth® Low Energy), Wi-Fi® components, and other communication components), and a power management interface 620 (for example, an interface to send/receive power or control signals).

Figure 7:
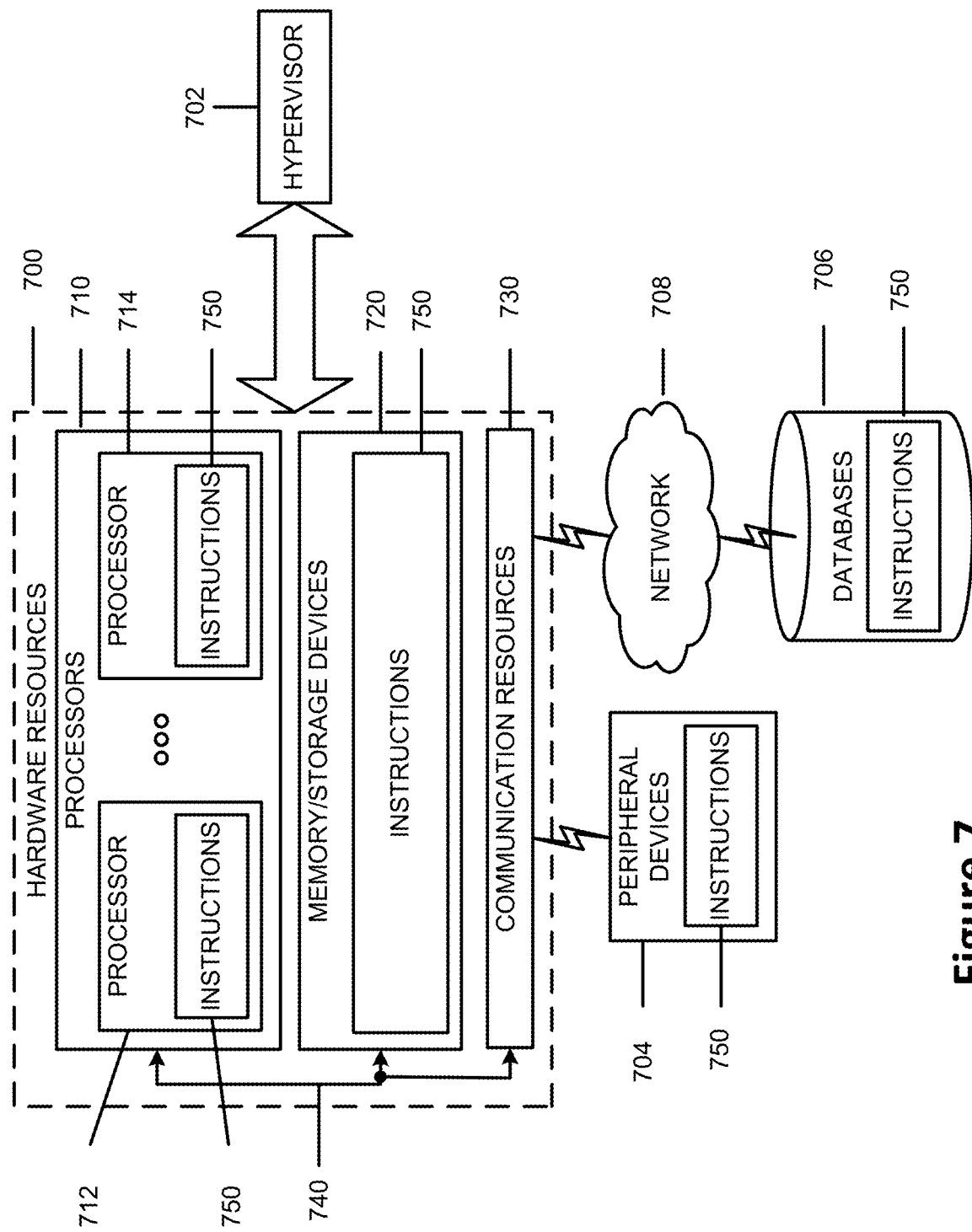
FIG. 7 illustrates hardware resources in accordance with some embodiments.

FIG. 7 is a block diagram illustrating components, according to some example embodiments, able to read instructions from a machine-readable or computer-readable medium (for example, a non-transitory machine-readable storage medium) and perform any one or more of the methodologies discussed herein. Specifically, FIG. 7 shows a diagrammatic representation of hardware resources 700 including one or more processors (or processor cores) 710, one or more memory/storage devices 720, and one or more communication resources 730, each of which may be communicatively coupled via a bus 740. For embodiments where node virtualization (for example, network function virtualization (NFV)) is utilized, a hypervisor 702 may be executed to provide an execution environment for one or more network slices/sub-slices to utilize the hardware resources 700.

The processors 710 (for example, a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 712 and a processor 714.

The memory/storage devices 720 may include main memory, disk storage, or any suitable combination thereof. The memory/storage devices 720 may include, but are not limited to, any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 730 may include interconnection or network interface components or other suitable devices to communicate with one or more peripheral devices 704 or one or more databases 706 via a network 708. For example, the communication resources 730 may include wired communication components (for example, for coupling via a Universal Serial Bus (USB)), cellular communication components, NFC components, Bluetooth® components (for example, Bluetooth® Low Energy), Wi-Fi® components, and other communication components.

Instructions 750 may comprise software, a program, an application, an applet, an app, or other executable code for causing at least any of the processors 710 to perform any one or more of the methodologies discussed herein. For example, in an embodiment in which the hardware resources 700 are implemented into the UE 105, the instructions 750 may cause the UE to perform some or all of the operation flow/algorithmic structure 400. In other embodiments, the hardware resources 700 may be implemented into the cell 110. The instructions 750 may cause the cell 110 to perform some or all of the operation flow/algorithmic structure 405. The instructions 750 may reside, completely or partially, within at least one of the processors 710 (for example, within the processor's cache memory), the memory/storage devices 720, or any suitable combination thereof. Furthermore, any portion of the instructions 750 may be transferred to the hardware resources 700 from any combination of the peripheral devices 704 or the databases 706. Accordingly, the memory of processors 710, the memory/storage devices 720, the peripheral devices 704, and the databases 706 are examples of computer-readable and machine-readable media.

Some non-limiting Examples of various embodiments are provided below.

Example 1 may include one or more computer-readable media comprising instructions to, upon execution of the instructions by one or more processors of a UE, cause the UE to: receive a plurality of SSBs in an SS that is transmitted by a cell; detect, based on the received plurality of SSBs, one or more NR-PSS IDs and NR-SSS IDs with respect to the cell; detect, based on the received plurality of SSBs, one or more SSB time indexes corresponding to the received plurality of SSBs; measure, based on the received plurality of SSBs, an SS-RSRP; and identify, based on the detected one or more NR-PSS IDs, NR-SSS IDs, and corresponding SSB time indexes, an NR cell ID associated with the measured SS-RSRP.

Example 2 may include the one or more computer-readable media of example 1 and/or some other example herein, wherein, upon execution, the instructions are to further cause the UE to generate a message to indicate the identified NR cell ID with the measured SS-RSRP.

Example 3 may include the one or more computer-readable media of examples 1-2 and/or some other example herein, wherein the instructions are to cause the UE to detect the one or more NR-PSS IDs and one or more NR-SSS IDs, detect the one or more SSB time indexes, measure the SS-RSRP, and identify the NR cell ID within a time period that comprises an NR-PSS and NR-SSS detection delay, an SSB-time-index detection delay, and a measurement delay.

Example 4 may include the one or more computer-readable media of examples 1-2 and/or some other example herein, wherein the plurality of SSBs are detected within an SS transmission window.

Example 5 may include the one or more computer-readable media of examples 1-2 and/or some other example herein, wherein to detect the one or more SSB time indexes is to detect a physical broadcast channel (PBCH) demodulation reference signal (DMRS) in the plurality of SSBs.

Example 6 may include the one or more computer-readable media of examples 1-2 and/or some other example herein, wherein to detect the one or more SSB time indexes is to detect a physical broadcast channel (PBCH) demodulation reference signal (DMRS) and PBCH payloads in the plurality of SSBs.

Example 7 may include the one or more computer-readable media of examples 1-2 and/or some other example herein, wherein, upon execution, the instructions are to further cause the UE to: measure, based on the received plurality of SSBs, one or more SS-RSRP values with respect to one or more NR-SSS signals associated with one or more NR beams that are transmitted by the cell; generate a message to indicate the measured SS-RSRP values associated with the one or more beams; and report the message to the cell for NR beam management.

Example 8 may include the one or more computer-readable media of example 7 and/or some other example herein, wherein the one or more beams are associated with one or more transmitting beam configurations implemented by the cell.

Example 9 may include the one or more computer-readable media of example 7 and/or some other example herein, wherein the measurement of the one or more SS-RSRP values, the generation of the message, and the reporting of the message are implemented for a beam recovery procedure.

Example 10 may include the one or more computer-readable media of examples 1-2 and/or some other example herein, wherein the cell is a neighbour cell of the UE and, upon execution, the instructions are to further cause the UE to: measure, based on the plurality of SSBs, one or more SS-RSRP values over one or more NR-SSS signals associated with one or more NR beams that are beamformed and transmitted by the neighbour cell; generate a message to indicate the measured one or more SS-RSRP values associated with the one or more beams of the neighbour cell; and report the message to a serving cell of the UE for NR beam management.

Example 11 may include one or more computer-readable media of examples 1-2 and/or some other example herein, wherein: the cell is a serving cell of the UE, the received SS includes one or more SSB REs and non-SSB REs in a plurality of OFDM symbols of the serving cell, the SSB REs and the non-SSB REs are associated with different SCSs, and, upon execution, the instructions are to further cause the UE to schedule a visible interruption or measurement gap so that the UE is not expected to receive or transmit non-SSB REs during NR cell ID detection.

Example 12 may include the one or more computer-readable media of example 11 and/or some other example herein, wherein the cell is a neighbour cell and, upon execution, the instructions are to further cause the UE to: receive a signal from a serving cell while receiving the SS from the neighbour cell; and schedule a visible interruption or measurement gap so that the UE is not expected to receive or transmit with respect to or in response to the signal from the serving cell during NR cell ID detection to the neighbour cell.

Example 13 may include the one or more computer-readable media of example 12 and/or some other example herein, wherein the signal from the serving cell is a PDCCH signal, a PDSCH signal, or an NR SS.

Example 14 may include one or more computer-readable media comprising instructions to, upon execution of the instructions by one or more processors of a UE, cause the UE to: receive a first signal from a serving cell of the UE and a second signal from a second cell during an intra-frequency measurement; schedule a visible interruption so that the UE is not expected to receive or transmit non-SSB REs during the visible interruption while the UE performs measurements to the second signal from the second cell.

Example 15 may include the one or more computer-readable media of example 14 and/or some other example herein, wherein the first signal is an SSB signal or non-SSB signal from the serving cell, the second cell is a neighbour cell, the second signal is an SSB signal from the neighbour cell, and the first signal and the second signal have different SCSs.

Example 16 may include the one or more computer-readable media of example 15 and/or some other example herein, wherein the second signal is a CSI-RS from the neighbour cell.

Example 17 may include the one or more computer-readable media of example 14 and/or some other example herein, wherein the first signal is an SSB signal or non-SSB signal from the serving cell, the second cell is a neighbour cell, the second signal is an SSB signal or a CSI-RS from the neighbour cell, and the first signal and the second signal operate in millimeter wave frequency range.

Example 18 may include the one or more computer-readable media of example 14 and/or some other example herein, wherein the intra-frequency measurement is an SS-RSRP measurement, an SS-RSRQ measurement, or an SS-SINR measurement.

Example 19 may include the one or more computer-readable media of example 14 and/or some other example herein, wherein, upon execution, the instructions are to further cause the UE to schedule a measurement gap so that the UE is free from transmitting or receiving any signals while measuring the second signal from the second cell.

Example 20 may include the one or more computer-readable media of examples 14 and/or some other example herein, wherein the first signal is a non-SSB signal from the serving cell, the second cell is the same serving cell, the second signal is an SSB signal from the serving cell, and the first signal and the second signal have different SCSs.

Example 21 may include one or more computer-readable media comprising instructions to, upon execution of the instructions by one or more processors of a cell, cause the cell to: generate at least one SS that includes one or more SSBs, each SSB includes a PSS, a SSS, and PBCH symbols; and transmit the at least one SS so that a UE is to receive the SS and detect a cell identification based on the received SS.

Example 22 may include the one or more computer-readable media of example 21 and/or some other example herein, wherein the cell is serving cell or a neighbour cell.

Example 23 may include the one or more computer-readable media of example 21 and/or some other example herein, wherein the cell is a serving cell and, upon execution, the instructions are to further cause the serving cell to: generate a message to indicate a cell identification requirement or a new beam identification requirement with respect to a target cell; transmit the message to the UE; and receive a message from the UE to indicate one or more measured SS-RSRP with respect to the target cell identification.

Example 24 may include a method comprising: receiving or causing to receive a plurality of SSBs in an SS that is transmitted by a cell; detecting or causing to detect, based on the received plurality of SSBs, one or more NR-PSS IDs and NR-SSS IDs with respect to the cell; detecting or causing to detect, based on the received plurality of SSBs, one or more SSB time indexes corresponding to the received plurality of SSBs; measuring or causing to measure, based on the received plurality of SSBs, an SS-RSRP; and identifying or causing to identify, based on the detected one or more NR-PSS IDs, NR-SSS IDs, and corresponding SSB time indexes, an NR cell ID associated with the measured SS-RSRP.

Example 25 may include the method of example 24 and/or some other example herein, further comprising generating or causing to generate a message to indicate the identified NR cell ID with the measured SS-RSRP.

Example 26 may include the method of examples 24-25 and/or some other example herein, wherein the detecting or causing to detect the one or more NR-PSS IDs and one or more NR-SSS IDs, detecting or causing to detect the one or more SSB time indexes, measuring or causing to measure the SS-RSRP, and identifying or causing to identify the NR cell ID within a time period that comprises an NR-PSS and NR-SSS detection delay, an SSB-time-index detection delay, and a measurement delay.

Example 27 may include the method of examples 24-25 and/or some other example herein, wherein the plurality of SSBs are detected within an SS transmission window.

Example 28 may include the method of examples 24-25 and/or some other example herein, wherein the detecting or causing to detect the one or more SSB time indexes is detecting or causing to detect a physical broadcast channel (PBCH) demodulation reference signal (DMRS) in the plurality of SSBs.

Example 29 may include the method of examples 24-25 and/or some other example herein, wherein the detecting or causing to detect the one or more SSB time indexes is detecting or causing to detect a physical broadcast channel (PBCH) demodulation reference signal (DMRS) and PBCH payloads in the plurality of SSBs.

Example 30 may include the method of examples 24-25 and/or some other example herein, further comprising: measuring or causing to measure, based on the received plurality of SSBs, one or more SS-RSRP values with respect to one or more NR-SSS signals associated with one or more NR beams that are transmitted by the cell; generate a message to indicate the measured SS-RSRP values associated with the one or more beams; and reporting or causing to report the message to the cell for NR beam management.

Example 31 may include the method of example 30 and/or some other example herein, wherein the one or more beams are associated with one or more transmitting beam configurations implemented by the cell.

Example 32 may include the method of example 30 and/or some other example herein, wherein the measurement of the one or more SS-RSRP values, the generation of the message, and the reporting of the message are implemented for a beam recovery procedure.

Example 33 may include the method of examples 24-25 and/or some other example herein, wherein the cell is a neighbour cell of the UE and, further comprising: measuring or causing to measure, based on the plurality of SSBs, one or more SS-RSRP values over one or more NR-SSS signals associated with one or more NR beams that are beamformed and transmitted by the neighbour cell; generating or causing to generate a message to indicate the measured one or more SS-RSRP values associated with the one or more beams of the neighbour cell; and reporting or causing to report the message to a serving cell of the UE for NR beam management.

Example 34 may include the method of examples 24-25 and/or some other example herein, wherein: the cell is a serving cell of the UE, the received SS includes one or more SSB REs and non-SSB REs in a plurality of OFDM symbols of the serving cell, the SSB REs and the non-SSB REs are associated with different SCSs, and, upon execution, the instructions are to further cause the UE to schedule a visible interruption or measurement gap so that the UE is not expected to receive or transmit non-SSB REs during NR cell ID detection.

Example 35 may include the method of example 34 and/or some other example herein, wherein the cell is a neighbour cell and further comprising receiving or causing to receive a signal from a serving cell while receiving the SS from the neighbour cell; and scheduling or causing to schedule a visible interruption or measurement gap so that the UE is not expected to receive or transmit with respect to or in response to the signal from the serving cell during NR cell ID detection to the neighbour cell.

Example 36 may include the method of example 35 and/or some other example herein, wherein the signal from the serving cell is a PDCCH signal, a PDSCH signal, or an NR SS.

Example 37 may include a method comprising receiving or causing to receive a first signal from a serving cell of the UE and a second signal from a second cell during an intra-frequency measurement; scheduling or causing to schedule a visible interruption so that the UE is not expected to receive or transmit non-SSB REs during the visible interruption while the UE performs measurements to the second signal from the second cell.

Example 38 may include the method of example 37 and/or some other example herein, wherein the first signal is an SSB signal or non-SSB signal from the serving cell, the second cell is a neighbour cell, the second signal is an SSB signal from the neighbour cell, and the first signal and the second signal have different SCSs.

Example 39 may include the method of example 38 and/or some other example herein, wherein the second signal is a CSI-RS from the neighbour cell.

Example 40 may include the method of example 37 and/or some other example herein, wherein the first signal is an SSB signal or non-SSB signal from the serving cell, the second cell is a neighbour cell, the second signal is an SSB signal or a CSI-RS from the neighbour cell, and the first signal and the second signal operate in millimeter wave frequency range.

Example 41 may include the method of example 37 and/or some other example herein, wherein the intra-frequency measurement is an SS-RSRP measurement, an SS-RSRQ measurement, or an SS-SINR measurement.

Example 42 may include the method of example 37 and/or some other example herein, further comprising scheduling or causing to schedule a measurement gap so that the UE is free from transmitting or receiving any signals while measuring the second signal from the second cell.

Example 43 may include the method of example 37 and/or some other example herein, wherein the first signal is a non-SSB signal from the serving cell, the second cell is the same serving cell, the second signal is an SSB signal from the serving cell, and the first signal and the second signal have different SCSs.

Example 44 may include a method comprising: generating or causing to generate at least one SS that includes one or more SSBs, each SSB includes a PSS, a SSS, and PBCH symbols; and transmitting or causing to transmit the at least one SS so that a UE is to receive the SS and detect a cell identification based on the received SS.

Example 45 may include the method of example 44 and/or some other example herein, wherein the cell is serving cell or a neighbour cell.

Example 46 may include the method of example 44 and/or some other example herein, wherein the cell is a serving cell and further comprising: generating or causing to generate a message to indicate a cell identification requirement or a new beam identification requirement with respect to a target cell; transmitting or causing to transmit the message to the UE; and receiving or causing to receive a message from the UE to indicate one or more measured SS-RSRP with respect to the target cell identification.

Example 47 may include an apparatus comprising means to perform one or more elements of a method described in or related to any of examples 24-46, or any other method or process described herein.

Example 48 may include one or more non-transitory computer-readable media comprising instructions to cause an electronic device, upon execution of the instructions by one or more processors of the electronic device, to perform one or more elements of a method described in or related to any of examples 24-46, or any other method or process described herein.

Example 49 may include an apparatus comprising logic, modules, and/or circuitry to perform one or more elements of a method described in or related to any of examples 24-46, or any other method or process described herein.

Example 50 may include a method, technique, or process as described in or related to any of examples 24-46, or portions or parts thereof.

Example 51 may include an apparatus comprising: one or more processors and one or more computer-readable media comprising instructions that, when executed by the one or more processors, cause the one or more processors to perform the method, technique, or process as described in or related to any of examples 24-46, or portions thereof.

The present disclosure is described with reference to flowchart illustrations or block diagrams of methods, apparatuses (systems) and computer program products according to embodiments of the disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means that implement the function/act specified in the flowchart or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide processes for implementing the functions/acts specified in the flowchart or block diagram block or blocks.

The description herein of illustrated implementations, including what is described in the Abstract, is not intended to be exhaustive or to limit the present disclosure to the precise forms disclosed. While specific implementations and examples are described herein for illustrative purposes, a variety of alternate or equivalent embodiments or implementations calculated to achieve the same purposes may be made in light of the above detailed description, without departing from the scope of the present disclosure, as those skilled in the relevant art will recognize.

What is claimed is:

1. A user equipment (UE), comprising:
    a memory configured to store program instructions; and
    a processor, upon executing the program instructions, configured to:
        receive a plurality of synchronization signal blocks (SSBs) that are transmitted by a cell, having corresponding new radio (NR) primary synchronization signals (PSSs) and NR secondary synchronization signals (SSSs);
        detect, based on the received plurality of SSBs and within an NR-PSS and NR-SSS detection delay, one or more NR-PSS identifications (IDs) and NR-SSS IDs corresponding to the cell;
        detect, based on the received plurality of SSBs and within an SSB-time-index detection delay, one or more SSB time indexes corresponding to the received plurality of SSBs;
        measure, based on the received plurality of SSBs and within a measurement delay, a synchronization signal (SS) reference signal received power (SS-RSRP); and
        identify, based on the detected one or more NR-PSS IDs and NR-SSS IDs, and the detected one or more SSB time indexes, an NR cell ID associated with the measured SS-RSRP.

2. The UE of claim 1, wherein to detect the one or more SSB time indexes, the processor, upon executing the program instructions, is configured to detect a physical broadcast channel (PBCH) demodulation reference signal (DMRS) in the plurality of SSBs.

3. The UE of claim 1, wherein to detect the one or more SSB time indexes, the processor, upon executing the program instructions, is configured to detect a physical broadcast channel (PBCH) demodulation reference signal (DMRS) and a PBCH payloads in the plurality of SSBs.

4. The UE of claim 1, wherein, upon executing the program instructions, the processor is further configured to:
    generate a message to indicate the identified NR cell ID with the measured SS-RSRP.

5. The UE of claim 1, wherein, upon executing the program instructions, the processor is further configured to detect the plurality of SSBs within a synchronization signal (SS) transmission window.

6. The UE of claim 1, wherein, upon executing the program instructions, the processor is further configured to:
    measure, based on the received plurality of SSBs, one or more SS-RSRP values associated with one or more NR-SSSs associated with one or more NR beams that are transmitted by the cell;
    generate a message to indicate the measured SS-RSRP values associated with the one or more beams; and
    transmit the message to the cell.

7. The UE of claim 6, wherein the one or more beams are associated with one or more transmitting beam configurations implemented by the cell.

8. The UE of claim 6, wherein the measuring the one or more SS-RSRP values, the generating the message, and the transmitting the message are implemented for a beam recovery procedure.

9. The UE of claim 1, wherein the cell is a neighbour cell of the UE and, upon executing the program instructions, the processor is further configured to:
    measure, based on the plurality of SSBs, one or more SS-RSRP values over one or more NR-SSS signals associated with one or more NR beams that are beamformed and transmitted by the neighbour cell;
    generate a message to indicate the measured one or more SS-RSRP values associated with the one or more beams of the neighbour cell; and
    report the message to a serving cell of the UE for NR beam management.

10. The UE of claim 1, wherein:
    the cell is a serving cell of the UE,
    a received synchronization signal (SS) includes one or more SSB resource elements (REs) and non-SSB REs in a plurality of orthogonal frequency-division multiplexing (OFDM) symbols of the serving cell,
    the SSB REs and the non-SSB REs are associated with different subcarrier spacings (SCSs), and
    upon executing the program instructions, the processor is further configured to determine an interruption or measurement gap in which the UE is not expected to receive or transmit non-SSB REs during an NR cell ID detection.

11. The UE of claim 1, wherein the cell is a neighbour cell and, upon executing the program instructions, the processor is further configured to:
    receive a signal from a serving cell while receiving the plurality of SSBs from the neighbour cell;
    determine the signal is received within an interruption or measurement gap; and
    refrain from processing the signal based on the determination.

12. The UE of claim 1, wherein the plurality of SSBs are part of an SS burst that is transmitted by the cell.

13. An access node, comprising:
a memory configured to store program instructions; and
a processor, upon executing the program instructions, configured to:
- generate at least one synchronization signal (SS) that comprises one or more synchronization signal blocks (SSBs), each SSB comprising a primary SS (PSS), a secondary SS (SSS), and physical broadcast channel (PBCH) symbols;
- determine a new radio (NR) PSS and NR-SSS detection delay, an SSB-time-index detection delay, and a measurement delay;
- communicate the NR-PSS and NR-SSS detection delay, the SSB-time-index detection delay, and the measurement delay to a user equipment (UE); and
- transmit the at least one SS burst to the UE.

14. The access node of claim 13, wherein the cell is a serving cell or a neighbour cell.

15. The access node of claim 13, wherein the cell is a serving cell and, upon executing the program instructions, the processor is further configured to:
- generate a message to indicate a cell identification requirement or a new beam identification requirement with respect to a target cell;
- transmit the message to the UE; and
- receive a message from the UE comprising one or more measured SS-RSRP values with respect to the target cell identification.

16. A method, comprising:
- receiving, by a user equipment (UE), a plurality of synchronization signal blocks (SSBs) that are transmitted by a cell, having corresponding new radio (NR) primary synchronization signals (PSSs) and NR secondary synchronization signals (SSSs);
- detecting, by the UE and based on the received plurality of SSBs and within an NR-PSS and NR-SSS detection delay, one or more NR-PSS identifications (IDs) and NR-SSS IDs corresponding to the cell;
- detecting, by the UE and based on the received plurality of SSBs and within an SSB-time-index detection delay, one or more SSB time indexes corresponding to the received plurality of SSBs;
- measuring, by the UE and based on the received plurality of SSBs and within a measurement delay, a synchronization signal (SS) reference signal received power (SS-RSRP); and
- identifying, by the UE and based on the detected one or more NR-PSS IDs and NR-SSS IDs, and the detected one or more SSB time indexes, an NR cell ID associated with the measured SS-RSRP.

17. The method of claim 16, wherein the detecting the one or more SSB time indexes comprises detecting a physical broadcast channel (PBCH) demodulation reference signal (DMRS) in the plurality of SSBs.

18. The method of claim 16, wherein the detecting the one or more SSB time indexes comprises detecting a physical broadcast channel (PBCH) demodulation reference signal (DMRS) and a PBCH payloads in the plurality of SSBs.

19. The method of claim 16, further comprising:
- generating a message to indicate the identified NR cell ID with the measured SS-RSRP.

20. A method, comprising:
- generating, by an access node, at least one synchronization signal (SS) that comprises one or more synchronization signal blocks (SSBs), each SSB comprising a primary SS (PSS), a secondary SS (SSS), and physical broadcast channel (PBCH) symbols;
- determining, by the access node, a new radio (NR) PSS and NR-SSS detection delay, an SSB-time-index detection delay, and a measurement delay;
- communicating, by the access node, the NR-PSS and NR-SSS detection delay, the SSB-time-index detection delay, and the measurement delay to a user equipment (UE); and
- transmitting, by the access node, the at least one SS burst to the UE.

* * * * *